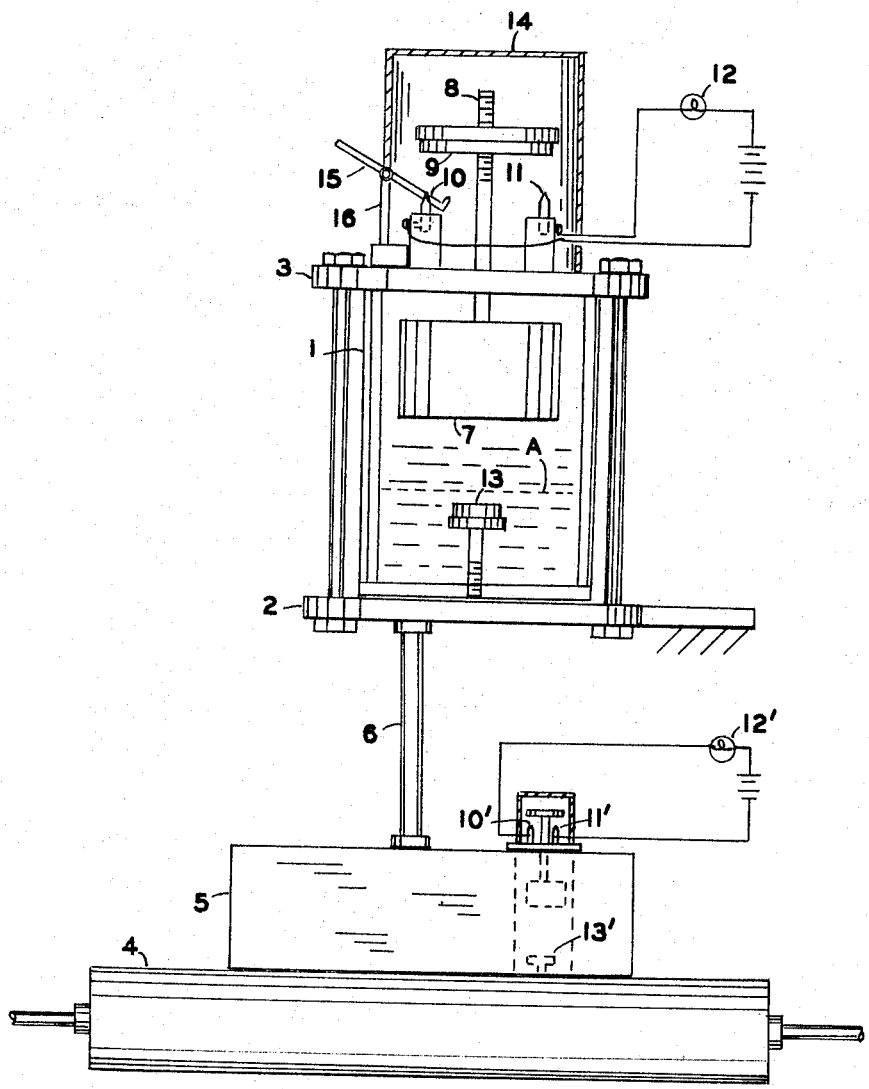

3,319,240
HYDRAULIC BRAKE FLUID LEVEL INDICATOR
Giacinto Mirarchi, 3091 Nassau Road, Oceanside, N.Y. 11572, and Felix Tirone, 62 Cambridge Drive, Hicksville, N.Y. 11801
Filed June 3, 1964, Ser. No. 372,310
1 Claim. (Cl. 340—244)

This invention relates to hydraulic brake safety means for vehicles and more particularly for means for providing a warning when the brake fluid falls below a predetermined safety level and also providing a reserve supply of fluid after that time.

The present invention specifically provides two warning means, the first warning occurs when the level falls to a first predetermined level in the reserve tank and the second warning occurs when the level falls to a second predetermined level corresponding to an unsafe driving condition.

All vehicles now have hydraulic brakes and are subject to the dangers occuring when there is a leak and the level falls below a safe level. Most people do not ordinarily check the level regularly in the master cylinder with the result that normal leakage quite often results in a dangerous condition.

The present invention provides a warning means when the level falls below a predetermined level and also provides reserve fluid for operating for many miles until the vehicle can reach a place where the liquid can be replenished. Also, a second warning device is provided which indicates when the level has fallen to such a point that there is not sufficient liquid left in the system for safe driving. Therefore, the interval between the two warnings will depend upon the size of the leak. Unless the leak is a major one, the reserve tank, of the present invention, will provide a sufficient amount of liquid for driving many miles and the operator will not feel in any danger until the second warning which will indicate when the car is unsafe to drive.

Another advantage of the present invention is that the reserve tank is a transparent tank which is visible so that when the car is serviced and the oil is checked, it is quite easy to visually check the level of the liquid in the reserve tank. Therefore, this will become a routine matter and will greatly increase the safety of the vehicle. The transparent reserve tank of the present invention may be mounted above and connected to any type of master cylinder. The bottom of the reserve tank is connected to the normally provided filling hole on a master cylinder.

Accordingly, a principal object of the invention is to provide new and improved hydraulic brake safety means.

Another object of the invention is to provide new and improved hydraulic brake safety means with warning means to indicate when the liquid level falls to a predetermined level.

Another object of the invention is to provide new and improved hydraulic brake safety means having warning means and a reserve tank which provides reserve fluid after the warning means has been actuated.

Another object of the invention is to provide a new and improved transparent reserve tank for hydraulic systems which is adapted to be connected to any master cylinder.

Another object of the invention is to provide new and improved hydraulic brake safety means having a first warning means when the level falls to a first level, having reserve tank means to operate the car in safety thereafter and having second warning means to indicate when the level has fallen to an unsafe level for operating the vehicle.

These and other objects of the invention will be apparent from the following specification and drawing:

Referring to the figure, the invention generally comprises, a preferably transparent reserve tank 1, which is mounted by means of a pair of brackets 2 and 3, above the existing master cylinder 4, which generally has an integral reserve tank 5. The bottom of the reserve tank 1 is connected to the normal filling opening of the reserve tank 5 by means of tubing 6.

The reserve tank includes switching means for indicating when the liquid level has fallen to a predetermined amount. These means include a metal float 7, which has shaft 8, mounted thereon which extends through the top bracket 3 of the tank. Mounted on the shaft 8 is a conductive disc 9. Mounted on the top bracket or cover 3 on insulation mountings are two point contacts 10 and 11 which are connected by wires to a warning device 12 which may be a light or an audio type warning or both. The conductive member 9 is preferably adjustably positioned on the shaft 8 by means of the threads on the top of the shaft 8.

Mounted on the bottom of the tank, is a permanent magnet 13, which is adapted to attract the float 7 when it falls within a certain distance of the magnet. The purpose of the magnet is to provide a good contact between the points 10 and 11 and the conductive member 9. The contact points 10 and 11 are preferably sharp needle type points which dig into the underside of the conductive member 9 and make a good contact even in the event there is a film of dirt or oxide on the member 9.

A cover 14 is adapted to fit over the switch to keep it clean and dry. A lever 15 is pivotally mounted on an extending member 16 connected to the top of the tank. The purpose of the lever 15 is to disengage the switch means 9 from the grip of the permanent magnet 13 when it is desired to reset the switch.

The apparatus thus far described is to provide a warning when the level reaches a predetermined level for instance, the level indicated at A. As can be seen this level can provide a considerable reserve fluid which will permit driving for many miles.

If it is desired to indicate when an unsafe driving condition is reached then a second switch and warning means is incorporated in the reserve tank 5 which is integral with master cylinder. This switch and float are the same as the switch and float previously described, having a pair of contact points 10', 11' and a magnet 13'. This float is adjusted so that the contacts are made and the second warning device 12' is energized when the level falls to a point which is considered to be an unsafe driving condition, that is when the level is so close to being unsafe that it is not feasible to drive the car without repairing the leak and replenishing the fluid.

The time interval between the two warnings will indicate to the driver, the severity of the leak. If there is a major leak, for instance, if one of the tubes is completely broken, the time interval will be short and a ruptured tube or connection is indicated.

Therefore the present invention provides new and improved means for indicating when the brake fluid needs to be replaced and provides a reserve supply of brake fluid. The invention also indicates when an unsafe condition has been reached and the interval between the two warnings will indicate the severity and the character of the malfunction.

Many modifications may be made by those who desire to practice the invention without departing from the scope thereof which is defined by the following claims.

We claim:

Hydraulic safety means for hydraulic brakes of the type having a master cylinder with a reserve tank comprising:
a transparent reserve container mounted above said master cylinder, pipe means connecting the bottom of said container to the top of said master cylinder reserve tank, a float of magnetically conductive material in said container,
switch means connected to be operated by said float comprising:
a shaft mounted on said float,
a first conductive member mounted on said shaft,
said shaft extending through the top of said container,
a pair of needle type contact points mounted on the top of said container,
said conductive member on said shaft being adapted to complete a circuit between said points when said float falls to a predetermined level,
a permanent magnet on the bottom of said container,
said magnet being adapted to attract said float to make a positive contact between said contact points and said conductive member,
externally operable lever means adapted to disengage said conductive member from said magnet, the grip of said magnet being strong enough to maintain said contact until said lever is operated, and
warning means connected to said contact points.

References Cited by the Examiner

UNITED STATES PATENTS

| | | | |
|---|---|---|---|
| 2,494,802 | 1/1950 | Fox | 340—59 X |
| 2,613,293 | 10/1952 | Marks | 340—244 X |
| 2,744,177 | 5/1956 | Barber | 340—244 X |
| 2,820,865 | 1/1958 | McKinnies | 200—84.3 |
| 2,825,895 | 3/1958 | Malagarie | 340—244 |
| 2,940,560 | 6/1960 | Kline | 340—59 X |
| 3,051,805 | 8/1962 | Binford | 200—84.3 X |

FOREIGN PATENTS 626,993   7/1949   Great Britain.

NEIL C. READ, *Primary Examiner.*

D. MYER, *Assistant Examiner.*